Oct. 19, 1971 R. W. RYNBERK 3,613,310
WATER LEVEL INDICATING AND CONTROL CONSTRUCTION
Filed Sept. 19, 1969
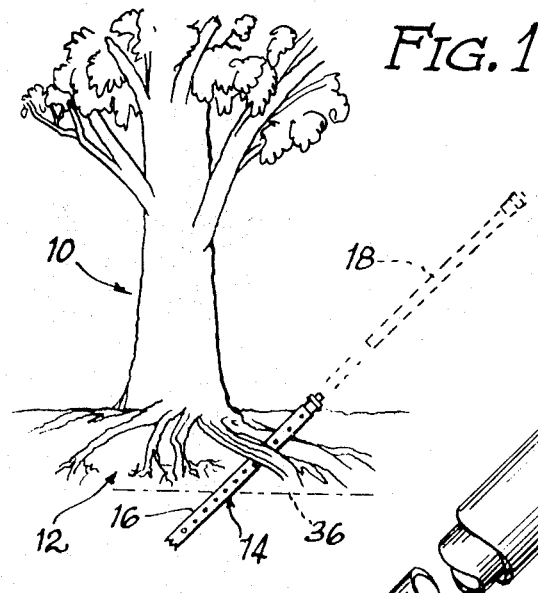
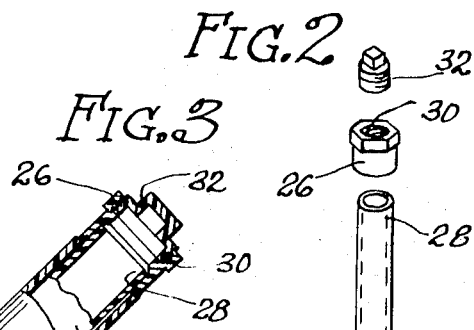
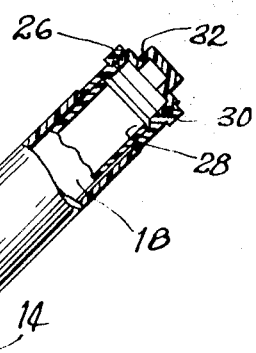
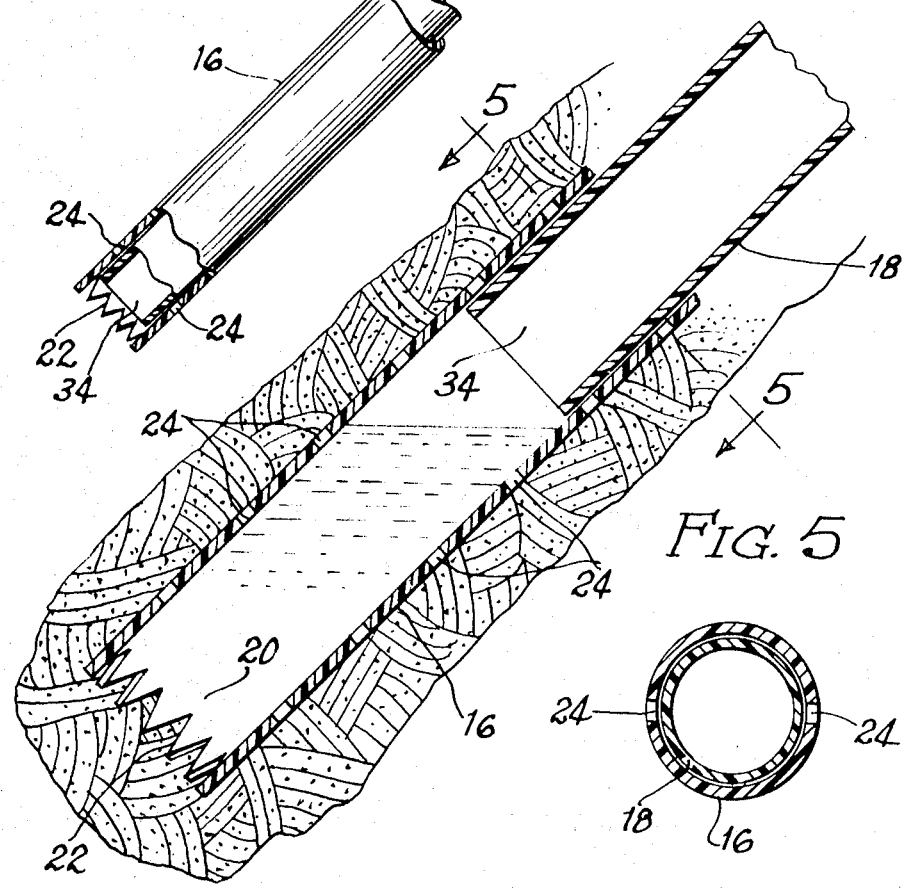
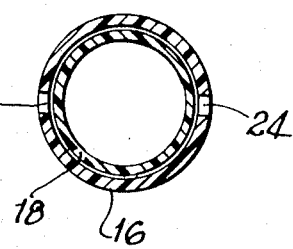
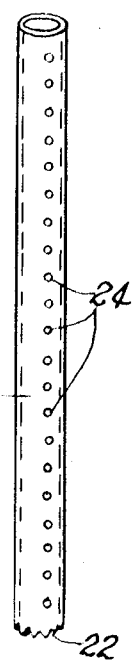
INVENTOR
Robert W. Rynberk
by McDougall, Hersh, Scott
and Ladd
Att'ys

United States Patent Office 3,613,310
Patented Oct. 19, 1971

3,613,310
WATER LEVEL INDICATING AND CONTROL CONSTRUCTION
Robert W. Rynberk, 4347 W. 109th St.,
Oak Lawn, Ill. 60453
Filed Sept. 19, 1969, Ser. No. 859,401
Int. Cl. A01g *29/00*
U.S. Cl. 47—48.5      4 Claims

ABSTRACT OF THE DISCLOSURE

A water level indicating and control construction adapted to be inserted in the ground for adding or removing water depending upon the water level detected by the construction. The construction comprises inner and outer tubular members with the outer member being held in the ground and with the inner member being slideable relative to the outer member so that it can be readily removed. Openings are defined by the outer member so that water will be retained in the outer member in accordance with the water level. The inner member serves as a dip stick while also providing means for removing water by suction when an excessive level is detected.

---

This invention relates to a tubular construction which serves as a means for detecting the water level in the area of the root system of a tree or other plant life. In addition to its detecting function, the construction of this invention serves as a means for controlling the water level particularly in the case of newly planted trees or plants.

It is well-known that plants of various types depend on water for growth, and that excessive water can be damaging to a plant to at least the same extent as inadequate water. This is particularly true in the case of new plants which are always subjected to some shock and which are, therefore, more susceptible to damage because of adverse water conditions.

Since the root system of plants is not visible, it is very difficult to determine the exact moisture conditions in the area of the roots. These conditions depend upon the nature of the soil, the natural water table, the natural rainfall, and the amount of additional water supplied. Because of these variable factors, a great deal of guesswork is involved with growing plants and many valuable plants have been lost. This is particularly true of the case of plants which are being grown by persons without nursery experience.

It is a general object of this invention to provide a construction which can be associated with plants, such as young trees, whereby the actual moisture conditions can be determined and controlled.

It is a more specific object of this invention to provide a construction which can be associated with plants so that an indication of the water level will be available at any time by undertaking a very simple water level reading procedure.

It is a further specific object of the invention to provide a construction of the type described which serves as a means for introducing water directly around the root system of plants and which is equally useful for withdrawing water in cases where an excess water level is detected.

These and other objects of this invention will appear hereinafter and for purposes of illustration, but not of limitation, specific embodiments of the invention are shown in the accompanying drawings in which:

FIG. 1 is an elevational view of a tree having the construction of the invention associated with its root system;

FIG. 2 is an exploded view illustrating the components of the construction;

FIGURE 3 is an assembly of the construction, partly cut away;

FIG. 4 is an enlarged fragmentary sectional view illustrating the end of the construction as it is embedded in the ground; and, FIG. 5 is a cross-sectional view taken about the line 5—5 of FIG. 4.

The water level indicating and control construction of this invention comprises an outer tubular member with an opening defined by the outer tubular member adjacent the bottom end thereof. This opening is provided to permit the entry and egress of water. An inner tubular member is slideably received within the outer tubular member, and a removable closure means is located at the top end of the inner tubular member.

When the inner tubular member is inserted in the outer tubular member, a water level mark will be formed on the inner tubular member so that it can be withdrawn in the manner of a dip stick to provide a reading of the water level. The construction also serves as a means for introducing water directly into the root system area since water will pass through the opening at the bottom end of the outer tubular member into the surrounding soil. Finally, the inner tubular member serves as a suction device for removing water when the water level is too high. This can be accomplished since the inner tubular member can be inserted with the closure removed. Water will then fill the lower end of the inner tubular member and with the closure back in place to seal the inner tubular member, this water will be withdrawn when the inner tubular member is pulled out.

FIG. 1 of the drawings illustrates a tree 10 having a root system 12. The construction 14 of this invention is embedded in the ground so that it will be positioned in the immediate area of the root system.

As shown in FIGS. 2 through 5, the construction 14 consists of an outer tubular member 16 and an inner tubular member 18. The inner tubular member is dimensioned so that it can be slideably received within the outer tubular member.

The outer tubular member defines an open end 20 which may have a saw-tooth configuration 22. This configuration is desirable if the outer tubular member should be inserted in the area of an already planted tree or other plant life. The saw-tooth configuration then will serve as a drill to simplify insertion of the outer tooth in the ground. Since the construction of the invention is, however, of particular value in the case of new plant life, it can be inserted in the ground along with the plants.

In addition to the open end 20, the outer tubular member may include a plurality of additional openings 24. These openings may extend along the length of the outer tubular member to permit entry of water at all levels occupied by the construction.

The inner tubular member 18 includes a cap 26 which is press-fit around the upper end 28. The cap defines a threaded opening 30 adapted to receive the threaded plug 32. This arrangement provides for sealing the top end of the inner tubular member while the bottom end 34 remains open.

In the use of the construction, it is first placed in the area of a root system, for example as shown in FIG. 1. If the moisture level is as shown by the line 36 in FIG. 1, then water will fill the end of each tubular member. In this connection, the tubular members should be substantially of the same length so that their end positions will coincide under normal circumstances.

To detect the water level, the inner tubular member 18 can simply be withdrawn in the manner of a dip stick. A water mark will appear on the exterior surface of the tubular member 18 and thereby provide a precise indication of the moisture conditions.

If the moisture level is too low, then the construction provides an ideal means for feeding water. Thus, water introduced will spread into the soil through the open end 20 and through the openings 24. In this connection, it will be understood that the construction is completely suitable for root feeding with fertilizers or other plant foods along with water.

If it should be found that the water level is excessive, then the inner tube provides a suction means for withdrawing water. Specifically, the plug 32 can be removed and the inner tube inserted. Removal of the plug 32 eliminates back pressure so that water will enter into the tubular member 18. The plug 32 can then be replaced and when the tubular member 18 is withdrawn, it will bring the water with it. This operation can be repeated until the water reaches a desired level.

The water withdrawal features can be of particular importance, for example in the planting of young trees. Such trees are usually planted by digging a hole of a size large enough to receive the roots which are usually wrapped in a burlap cover. Such trees require a certain amount of water; however, if there is excessive watering or a heavy rainfall, then a pocket of water tends to build-up in the excavated area. This unnatural condition can be removed by means of the construction described.

Where the construction of this invention is located in the ground when planting a new tree, then watering and feeding of the tree in a controlled fashion is made possible. The system is highly preferable to other arrangements which involve temporary insertion of pressure watering and feeding devices below the surface. Such devices can damage the delicate root systems which characterize young, recently transplanted trees. The system of this invention is also superior to surface watering and feeding since the materials introduced saturate the surrounding soil in the immediate area of the root systems. Surface watering can also be very misleading since the surface soil may appear quite moist when in fact the soil in the area of the roots is completely dry.

The construction described is preferably made of a material, such as a rigid polyethylene, which will survive indefinitely and thereby provide a permanent means for watering and feeding associated plant life. Other materials of comparable characteristics could also be utilized.

In addition to the watering and feeding advantages, the construction of this invention also provides for aeration of root structures. Thus, the cavities of the tubes will provide a constant square of air in direct association with the root area.

It will be understood that various changes and modifications may be made in the above described construction without departing from the spirit of the invention.

That which is claimed is:

1. A water level indicating and control construction for root systems comprising an outer tubular member, openings defined by said outer tubular member adjacent the bottom end thereof permitting the entry and egress of water, said openings being provided by the open bottom end of said outer tubular member and by additional openings formed at spaced intervals along the length of said outer tubular member, an inner tubular member dimensioned to be slideably received within said outer tubular member and having a length about the same as said outer tubular member, an opening of reduced diameter defined at the top end of said inner tubular member, said opening at said top end being adapted to be closed for thereby sealing said top end, the exterior surface of said inner tubular member serving as a dip stick to indicate the water level in the area surrounding said construction when the construction is inserted in the ground, and wherein water is introduced into said area by passing water through the openings in said outer tubular member while water can be removed from said area by employing said inner tubular member as a suction device when said opening at said top end is closed.

2. A construction in accordance with claim 1 wherein said inner tubular member top end opening is defined by a removable closure at said top end comprising a cap secured to the top end, a threaded opening in said cap, and a plug removably retained in said opening.

3. A construction in accordance with claim 1 wherein said inner and outer tubular members define a cylindrical cross section.

4. A construction in accordance with claim 1 wherein said open bottom end defines a saw tooth configuration to assist in locating the construction in position in the ground.

References Cited
UNITED STATES PATENTS

| | | | |
|---|---|---|---|
| 1,109,446 | 9/1914 | Melberg | 73—425.2 |
| 1,717,188 | 6/1929 | Ciomei | 33—126.7 |
| 3,321,087 | 5/1967 | Fuge et al. | 73—425 |
| 3,471,968 | 10/1969 | Letz | 47—47 |
| 3,506,296 | 4/1970 | Nelson | 294—50.7 |

ROBERT E. BAGWILL, Primary Examiner

U.S. Cl. X.R.

33—126.7; 73—425.6